(12) United States Patent
Kotecha et al.

(10) Patent No.: US 9,055,608 B2
(45) Date of Patent: Jun. 9, 2015

(54) FREQUENCY BAND ADMISSION

(75) Inventors: Lalit R. Kotecha, San Ramon, CA (US); Kamlesh S. Kamdar, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 335 days.

(21) Appl. No.: 13/601,180

(22) Filed: Aug. 31, 2012

(65) Prior Publication Data
US 2014/0066050 A1 Mar. 6, 2014

(51) Int. Cl.
*H04W 72/00* (2009.01)
*H04B 7/00* (2006.01)
*H04M 1/00* (2006.01)
*H04B 1/04* (2006.01)
*H04W 36/00* (2009.01)
*H04W 4/00* (2009.01)
*H04W 88/06* (2009.01)
*H04W 4/22* (2009.01)

(52) U.S. Cl.
CPC ............... *H04W 88/06* (2013.01); *H04W 4/22* (2013.01)

(58) Field of Classification Search
CPC ....... H04W 28/08; H04W 24/00; H04W 4/22; H04W 16/14
USPC ...................... 455/450–453, 509, 553, 127.4, 455/436–443; 370/331
See application file for complete search history.

(56) References Cited

U.S. PATENT DOCUMENTS

| | | | |
|---|---|---|---|
| 8,400,988 B2* | 3/2013 | Liu et al. .................. | 370/338 |
| 2002/0004379 A1* | 1/2002 | Gruhl et al. ................ | 455/403 |
| 2007/0281711 A1* | 12/2007 | Matta ....................... | 455/453 |
| 2011/0122801 A1* | 5/2011 | Franklin et al. ............ | 370/280 |
| 2011/0199898 A1* | 8/2011 | Cho et al. .................. | 370/230 |
| 2013/0128738 A1* | 5/2013 | Cohen et al. ............... | 370/235 |
| 2013/0210444 A1* | 8/2013 | Morrin ...................... | 455/445 |

* cited by examiner

Primary Examiner — Dung Hong (57) ABSTRACT

A device is configured to receive a request, from a user device, to connect to a network using a first frequency band. The device is configured to determine that the first frequency band cannot accommodate the user device. The device is configured to determine that the user device can connect to the network using a second frequency band, and connect the user device to the network using the second frequency band rather than the first frequency band.

20 Claims, 7 Drawing Sheets

FREQUENCY BAND ADMISSION

BACKGROUND

A base station, using a frequency band, may receive and/or transmit traffic (from a network) destined for and/or received from multiple user devices. The frequency band may have a finite capacity that allows a maximum number of user devices to use the frequency band to communicate via the network.

DETAILED DESCRIPTION OF PREFERRED EMBODIMENTS

The following detailed description refers to the accompanying drawings. The same reference numbers in different drawings may identify the same or similar elements.

Systems and/or methods described herein may allow a base station to connect a user device to one or more frequency bands based on the amount of capacity within a particular band to accept additional user devices and the capability of the user device to use multiple frequency bands, and/or to change the connection of a user device to a different frequency band based on the user device's priority in comparison to the priority of other user devices and the capability of the user device to use multiple frequency bands.

Figure 1:
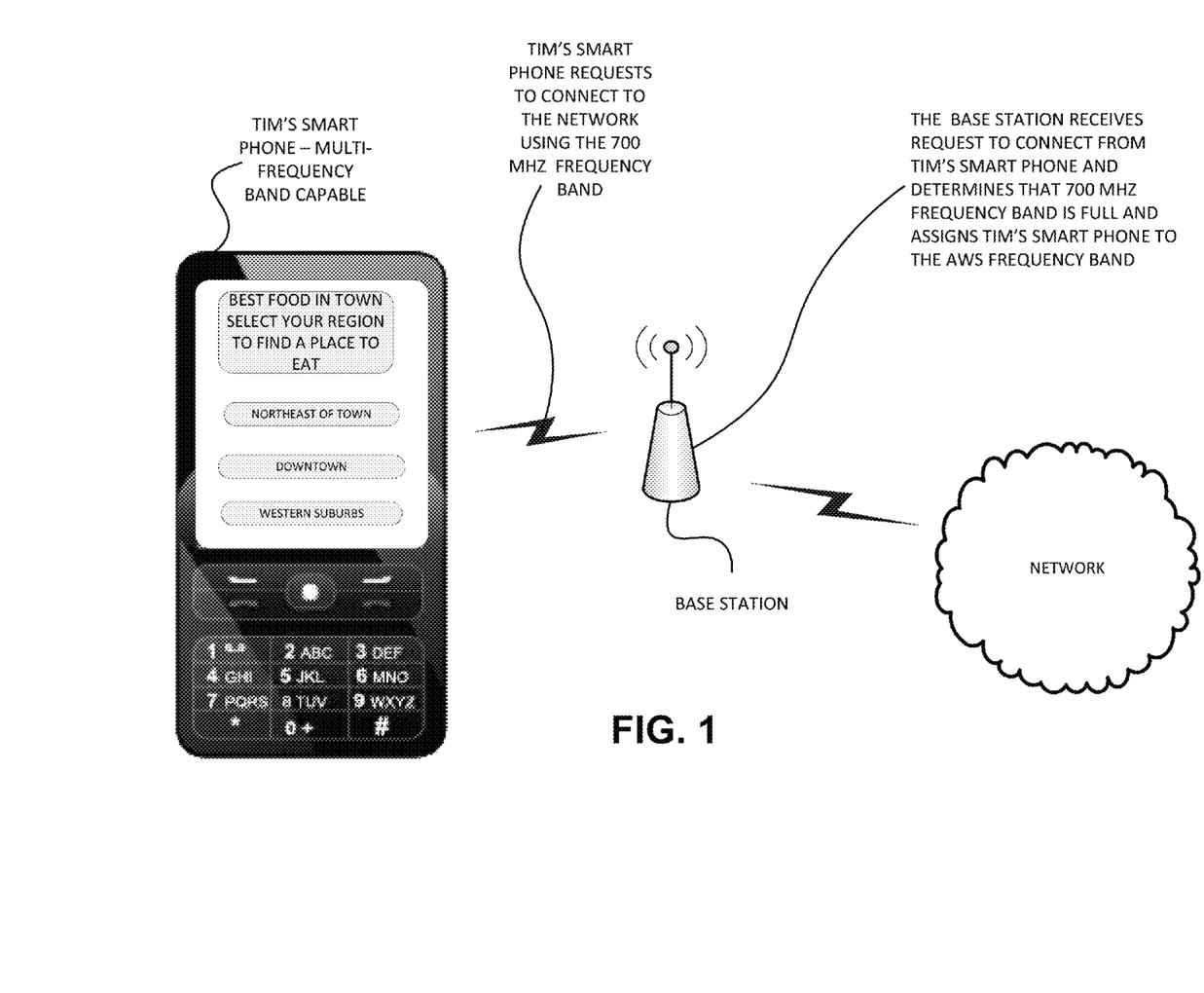
FIG. 1 is a diagram of an overview of an implementation described herein.

FIG. 1 is a diagram of an overview of an implementation described herein. FIG. 1 show Tim's smart phone, a base station, and a network. As shown in FIG. 1, Tim is using an application on his smart phone to find a place to eat near his home. Tim's smart phone is capable of connecting to the network using different frequency bands (multi-band capable). Tim's smart phone may have the capacity to connect to the network using the 700 MHz frequency band and the AWS frequency band.

Tim's smart phone sends a connection request to the base station. The connection request includes a request to connect to the base station using the 700 MHz frequency band. The base station receives the request from Tim's smart phone. The base station may determine that the 700 MHz frequency band has no available capacity and cannot admit Tim's smart phone to the 700 MHz frequency band. The base station may determine that since Tim's smart phone is multi-band capable, the base station can connect Tim's smart phone to the network by using the AWS frequency band. Thus, Tim's smart phone is connected to the network by using the AWS frequency band.

As a result, a base station may allocate user devices more efficiently to different frequency bands based on the available capacity of a particular frequency band, the number of user devices requesting to use a particular frequency band, the frequency band capabilities of the user device, and/or the priority level of the requested communication being made by the user device. With the ability to efficiently connect user devices to the network using different frequency bands, the network may be able to meet the growth demands of additional user devices that are being subscribed to the network.

Figure 2:
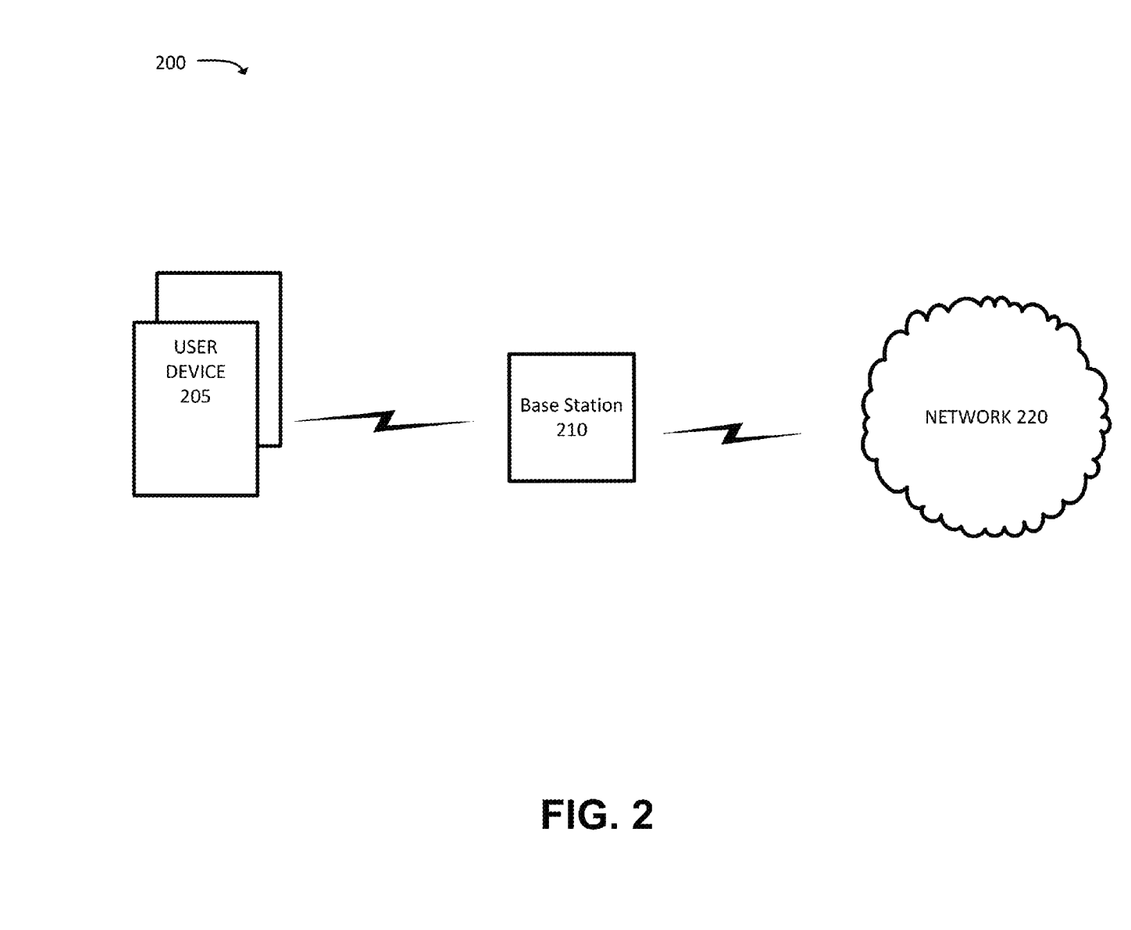
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a base station 210, and network 220. The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

User device 205 may include any computation or communication device, such as a wireless mobile communication device that is capable of communicating with a network (e.g., network 220) by using one or more types of frequency bands. For example, user device 205 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, or another type of mobile, computation, or communication device.

User device 205 may include a variety of applications, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or another type of application (e.g., a word processing application, a spreadsheet application, etc.).

Base station 210 may include one or more network devices that receive, process, and/or transmit traffic, such as audio, video, text, and/or other data, destined for and/or received from user device 205. Base station 210 may send traffic to and/or receive traffic from user device 205 via an air interface. In some example implementations, base station 210 may be an eNodeB ("eNB") device and may be part of a long term evolution (LTE) network. One or more base stations 210 may be associated with a RAN, such as the LTE network.

Network 220 may include one or more wired and/or wireless networks. For example, network 220 may include a cellular network, a public land mobile network (PLMN), a second generation (2G) network, a third generation (3G) network, a fourth generation (4G) network, a fifth generation (5G) network, and/or another network. Additionally, or alternatively, network 220 may include a local area network (LAN), a wide area network (WAN), a metropolitan network (MAN), a telephone network (e.g., the Public Switched Telephone Network (PTSN)), an ad hoc network, a managed IP network, a virtual private network (VPN), an intranet, the Internet, a fiber optic-based network, and/or combination of these or other types of networks. Devices of environment 200 may interconnect via network 220.

Figure 3:
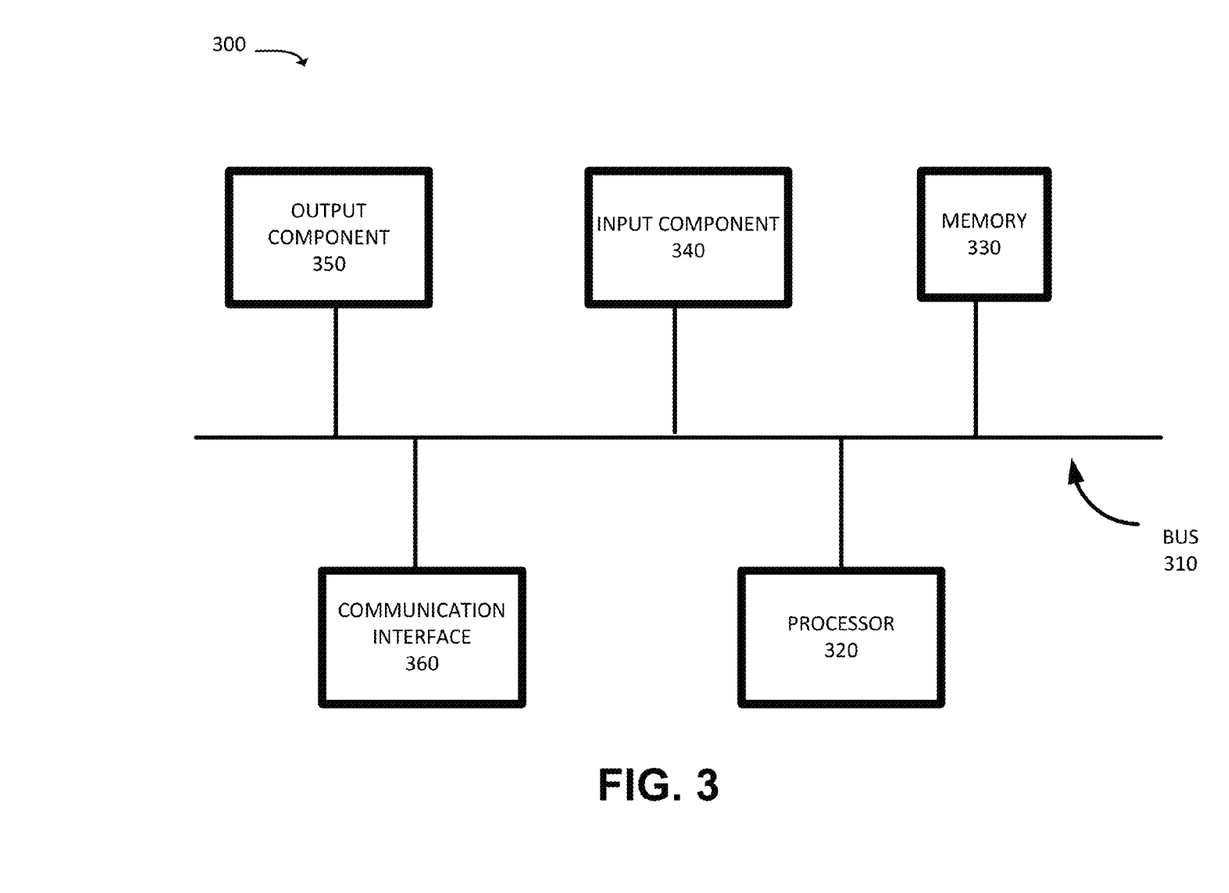
FIG. 3 is a diagram of example components of a user device of FIG. 2.

FIG. 3 is a diagram of example components of a device 300. Device 300 may correspond to user device 205. Additionally, or alternatively, user device 205 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with other networks and/or devices connected to network 220.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
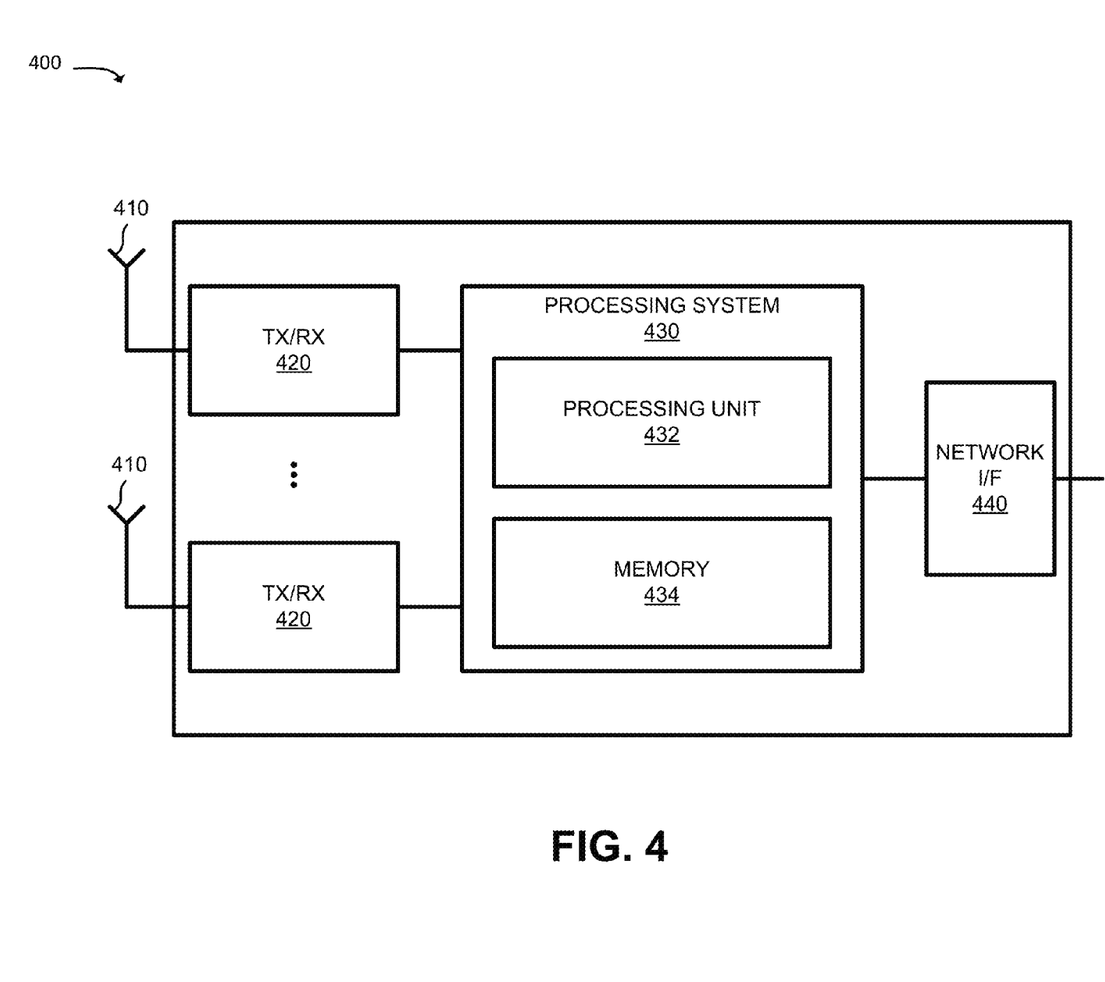
FIG. 4 is a diagram of an example components of a base station of the network depicted in FIG. 2.

FIG. 4 is a diagram of example components of device 400 that may correspond to base station 210. Alternatively, or additionally, base station 210 may include one or more devices 400 and/or one or more components of device 400.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

As shown in FIG. 4, device 400 may include antennas 410, transceivers (TX/RX) 420, a processing system 430, and a network interface (I/F) 440. Antennas 410 may include one or more directional and/or omni-directional antennas. Transceivers 420 may be associated with antennas 410 and may include transceiver circuitry for transmitting and/or receiving symbol sequences in a network, such as network 220, via antennas 410.

Processing system 430 may control the operation of device 400. Processing system 430 may also process information received via transceivers 420 and network interface 440. Processing system 430 may further measure quality and strength of a connection, may determine a frame error rate (FER), and may transmit this information to network 220. As illustrated, processing system 430 may include a processing unit 432 and a memory 434.

Processing unit 432 may include one or more processors, microprocessors, application specific integrated circuits (ASICs), field programmable gate arrays (FPGAs), or the like. Processing unit 432 may process information received via transceivers 420 and network interface 440. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 432 may transmit control messages and/or data messages, and may cause those control messages and/or data messages to be transmitted via transceivers 420 and/or network interface 440. Processing unit 432 may also process control messages and/or data messages received from transceivers 420 and/or network interface 440.

Memory 434 may include a random access memory (RAM), a read-only memory (ROM), and/or another type of memory to store data and instructions that may be used by processing unit 432.

Network interface 440 may include one or more input/output devices that allow device 400 to transmit data to and receive data from another device, such as a radio network controller.

As described herein, device 400 may perform certain operations in response to processing unit 432 executing software instructions contained in a computer-readable medium, such as memory 434. The software instructions may be read into memory 434 from another computer-readable medium or from another device via antennas 410 and transceivers 420. The software instructions contained in memory 434 may cause processing unit 432 to perform processes described herein. Alternatively, hardwired circuitry may be used in place of or in combination with software instructions to implement processes described herein. Thus, implementations described herein are not limited to any specific combination of hardware circuitry and software.

Figure 5:
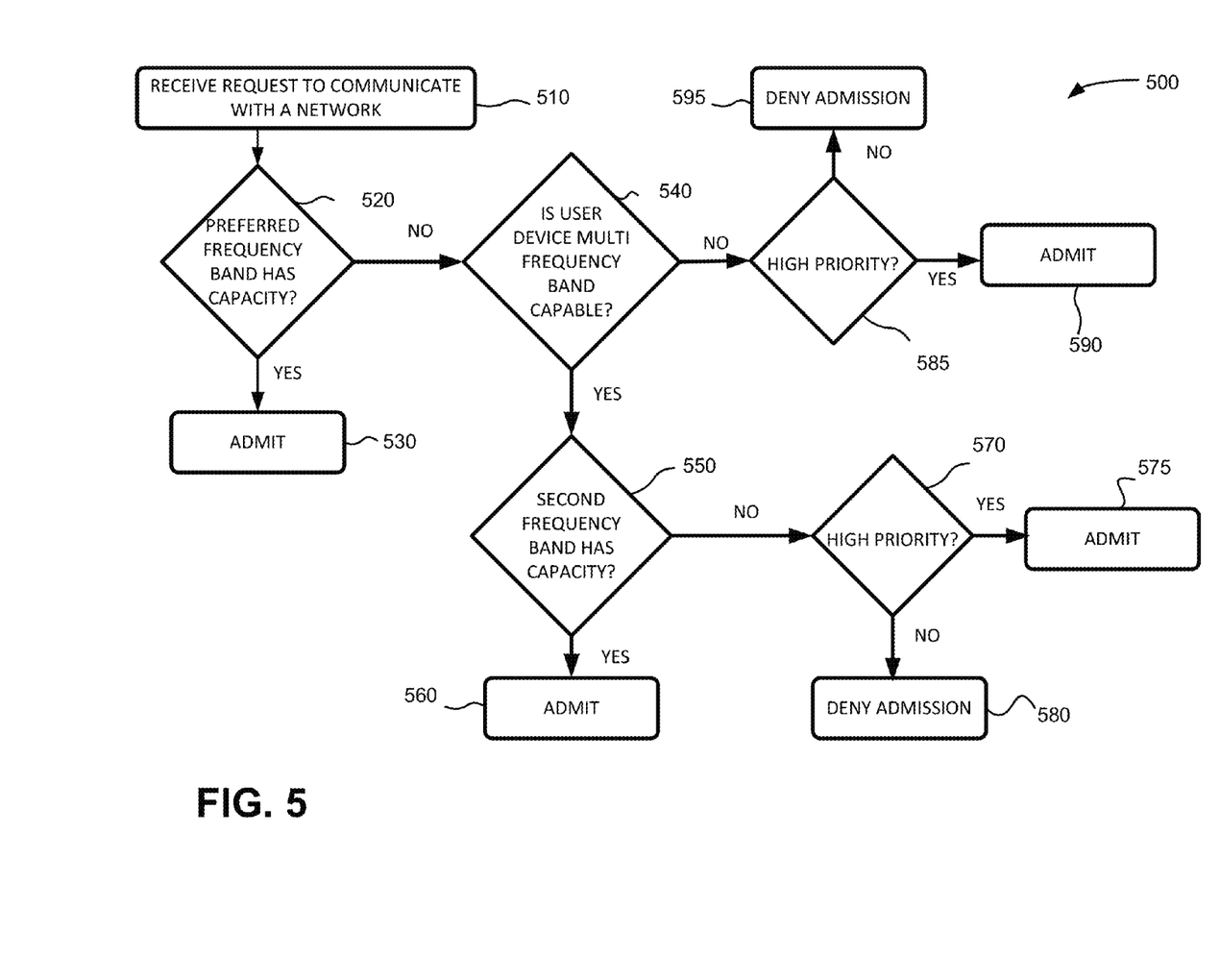
FIG. 5 is a flow chart of an example process for connecting a user device to a network using a frequency band.

FIG. 5 is a flow chart of an example process 500 for connecting a user device to a network using a frequency band. In one implementation, process 500 may be performed by base station 210. In another example implementation, one or more blocks of process 500 may be performed by one or more other devices, such as user device 205.

Process 500 may include receiving a request to communicate with a network (block 510). For example, base station 210 may receive a request to connect to network 220 from user device 205. A user, of user device 205, may have turned on user device 205 (e.g., a smart phone) and user device 205 may be sending a communication, to base station 210, requesting connection to the network.

Alternatively, the request to communicate with a network may be associated with base station 210 receiving a request from user device 205 to send/receive communications from network 220. For example, a user, of user device 205 (already connected to network 220, via base station 210), may want to download video content while user device 205 is being used to send text messages at the same time. For the user to download video content, user device 205 may send a request to base station 210 to receive the video content. Base station 210 may receive the request and may determine which frequency band should be used to allow user device 205 to receive the video content.

Alternatively, the request to communicate with a network may be associated with user device 205 being handed over from a different base station 210 (associated with a different coverage area in the network) to base station 210.

In any of the above situations, user device 205 that is multi-frequency band capable may be capable of communicating with base station 210 via one or more different types of frequency bands (such as the multipoint multichannel distribution service ("MMDS") frequency band, universal mobile telecommunication system ("UMTS") frequency band, 700 MHz frequency band, the AWS frequency band, etc.). For example, if user device 205 is multi-frequency band capable, user device 205 may use one frequency band for one type of communication (e.g., a phone call), while, at the same time, using another frequency band for another type of communication (e.g., downloading video content).

If the preferred frequency band has available capacity (block 520—YES), process 500 may include admitting the user device to the network using the frequency band preferred by the user device (block 530). Base station 210 may determine whether a preferred (based on a request by user device 205 associated with a particular frequency band) frequency band (e.g., the 700 MHz frequency band) has available capacity to allow user device 205 to use the particular frequency band to connect with the network. Base station 220 may determine that the preferred frequency band has available capacity.

In one example implementation, base station 210 may determine that the preferred frequency band has available capacity based on the amount of available capacity in the preferred frequency band.

In another example implementation, base station 210 may determine that the preferred frequency band has available capacity based on different levels of quality of service class identifiers (hereinafter referred to as "QCI") within the preferred frequency band. The QCI level is associated with a particular level of quality of service (QoS) associated with the type of communication being made by user device 205. Each QCI level may have several different factors associated with a level of QoS. These factors include a level of bit error rate, latency, a packet delay budget, and/or other factors associated with QoS. For example, the preferred frequency band may allocate 30% of its capacity to QCI level 1, and 20% to QCI level 2 and base station 210 may determine that there is available capacity within the QCI level 1 segment of the preferred frequency band to admit user device 205.

In another example implementation, base station 210 may determine that the preferred frequency band has available capacity, based on the preferred frequency band allocating capacity based on the type of information. For example, the preferred frequency band may allocate capacity based on different types of information, such as conversational voice, conversational video, real time gaming, non-conversational video, IMS signaling, interactive gaming, and other types of information. For example, the preferred frequency band may allocate 10% of its capacity to conversational voice and 5% of its capacity to real-time gaming.

In another example implementation, base station 210 may determine that the preferred frequency band has available capacity, based on the frequency band allocating capacity based on guaranteed bit rate (GBR) communications and non-GBR communications. For example, a frequency band may allocate 50% of its capacity to GBR communications and 50% of its capacity to non-GBR communications. User device 205 may be requesting to connect to network 220 to make a GBR communication and base station 210 may determine that there is enough capacity in the GBR portion of the preferred frequency band to admit user device 205.

If the preferred frequency band does not have the available capacity (block 520—NO), process 500 may include determining whether the user device is multi-frequency band capable (block 540). For example, user device 205 may be able to communicate with the network by using more than one type of frequency band (described with regard to block 510). Base station 210 may determine that user device 205 is multi-frequency band capable based on identifier information associated with user device 205. The identifier information (either stored by base station 210 or provided to base station 210 from another network device in network 220) may include the frequency band capabilities of user device 205. If the user device is multi-frequency band capable (block 540—YES), process 500 may include determining whether a second frequency band has available capacity (block 550).

If the second frequency band has available capacity (block 550—YES), process 500 may include admitting the user device to network using the second frequency band (block 560). Base station 210 may determine that the second frequency band has available capacity to allow user device 205 to use that second frequency band to connect with the network. Base station 210 may determine the available capacity in a manner similar to the examples for determining the available capacity described with regard to block 520.

In one example implementation, base station 220 may connect user device 205 to network 220 using the second frequency band. In another example implementation, base station 220 may send a message to user device 205 requesting to connect user device 205 to the network using the second frequency band. User device 205 may receive the message and may accept the request to connect the network using the second frequency band.

If the second frequency band does not have the available capacity (block 550—NO), process 500 may include determining whether the user device has a high priority level to be admitted to the network using the second frequency band that has limited capacity (block 570).

If the user device has a high priority level to be admitted to the second frequency band that has limited capacity (block 570—YES), then process 500 may include admitting the user device to the network using the second frequency band (block 575).

Base station 210 may determine the priority of user device 205 by comparing the priority of user device 205 to other user devices within a frequency band. Base station 210 may determine the priority of user device 205 by comparing the allocation retention priority (ARP) value of the type of communication being made by user device 205. The type of communication may be a 911 phone call, a military communication, a communication associated with an emergency service (e.g., a police officer making an emergency phone call), GBR voice calls, GBR video content, non-GBR video content, real-time games, and/or other types of communications. For example, if user device 205 is being used to make a 911 call, then user device 205 may have higher ARP value than another user device 205 being used to watch video content. User device 205 (being used to make the 911 call) may be admitted to the frequency band. The other user device 205 may be stay admitted to the frequency band, may be dropped from the frequency band (if the other user device 205 has a low ARP value and is not capable of using more than one type of frequency band), or the other user device 205 may be handed over to a different frequency band (based on the other user device 205 being capable of using more than one type of frequency band).

If the user device does not have a high priority to be admitted to the second frequency band that has limited capacity (block 570—NO), then process 500 may include denying admission of the user device to the network using the second frequency band (block 580).

Base station 210 may determine the priority of user device 205 by comparing the priority of user device 205 to other user devices 205 that may be admitted to a particular frequency band and/or other user devices 205 that may be requesting admission to the particular frequency band. Base station 210 may determine that user device 205 does not a higher priority in comparison to other user devices 205 and may deny admission to user device 205. For example, base station 210 may determine that the ARP value (described with regard to block 575) of user device 205 is not high enough in comparison to the ARP value of other user devices 205. Additionally, or alternatively, base station 210 may determine that user device 205 is requesting non-GBR information, as described above, that does not have a high priority level.

If the user device is not multi-frequency band capable (block 540—NO), then process 500 may include determining whether the user device has a high priority to be admitted to the network using the preferred frequency band (block 585).

If the user device has a high priority to be admitted to the preferred frequency band (block 585—YES), then process 500 may include admitting the user device to the network using the preferred frequency band (block 590). Base station 210 may determine priority in a manner similar to base station 210 determining priority for the second frequency band, described with regard to block 575.

If the user device does not have a high priority to be admitted to the preferred frequency (block 585—NO), then process 500 may include denying the user device admission to the network using the preferred frequency band (block 595).

Base station 210 may determine priority in a manner similar to base station 210 determining priority for the second frequency band, described with regard to block 580.

Once admitted to the network using a frequency band (described with regard to block 530, block 560, block 575, or block 590), user device 205 may be transferred from the preferred frequency band to another frequency band. For example, user device 205 may change to a geographic area that uses a different base station 210 that may assign user device 205 to another frequency band. Alternatively, user device 205 may be transferred to another frequency band, or may be dropped from the preferred frequency band, because other user devices 205 may have a higher priority to use the other frequency band than user device 205. Alternatively, base station 210 may anticipate that a preferred frequency band is going to be reaching full capacity and may move user device 205 to another frequency band, or base station 210 may request user device 205 to move to another frequency band and user device 205 may make the determination whether user device 205 should move to a different frequency band.

Figure 6:
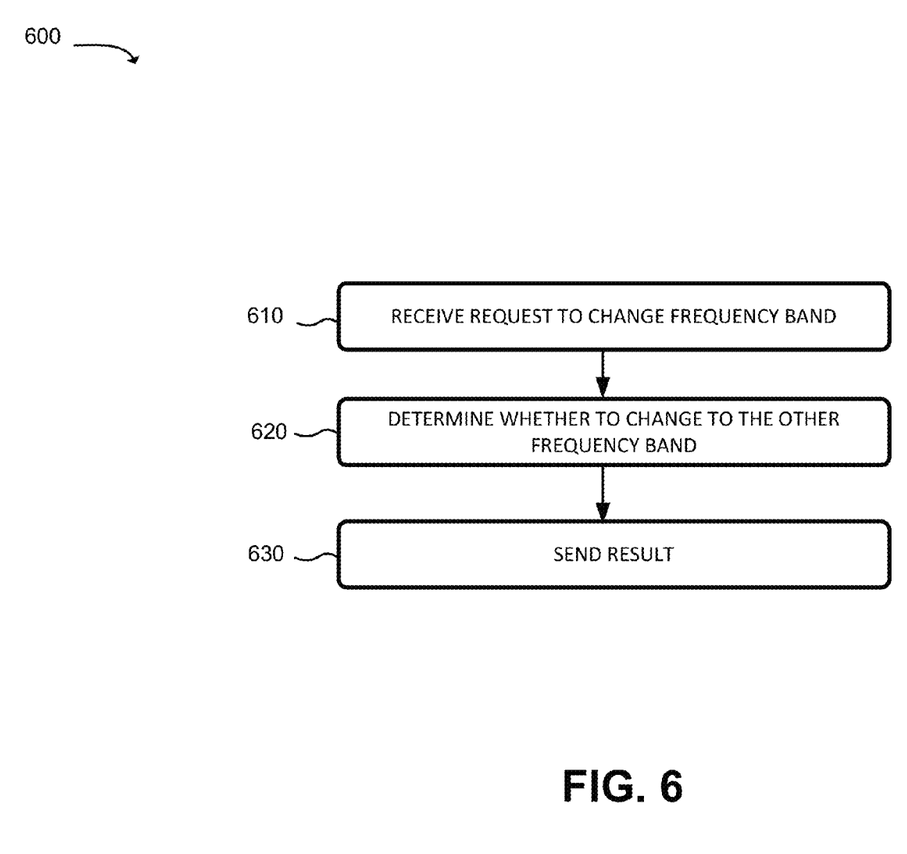
FIG. 6 is a flow chart of an example process for connecting a user device to a network using a frequency band.

FIG. 6 is an example process 600 for connecting a user device to a network using a frequency band. In one implementation, process 600 may be performed by user device 205. In another example implementation, one or more blocks of process 600 may be performed by one or more other devices, such as base station 210.

Process 600 may include receiving a request to change the frequency band (block 610). For example, user device 205 may be connected to a network using a particular frequency band (e.g., 700 MHz frequency band), or user device 205 may be requesting to connect to a particular frequency band. Base station 210 may send a message to user device 205 requesting user device 205 to be transferred to, or to use, another frequency band (e.g., AWS frequency band). The message may include information about the load levels for various priorities (e.g., the load level for a particular priority level in a frequency band may have no additional capacity for user device 205). Base station 210 may have identifier information regarding user device 205 that allows base station 210 to determine that user device 205 is capable of being transferred to the other frequency band. Base station 210 may be requesting user device 205 to change to another frequency band based on another user device 205 (that has a higher ARP value than user device 205) that is requesting admission to the particular frequency band. Base station 210 may have determined that there is not enough capacity for user device 205 and the other user device 205, and that user device 205 should be moved to another frequency band that has available capacity.

Process 600 may include determining whether to change to the other frequency band (block 620). For example, user device 205 may determine whether to use the other frequency band being offered by base station 210. User device 205 may determine that it does not want to change frequency bands based on the request from base station 210. For example, user device 205 may determine that the transfer from one frequency band to the other frequency band may result in loss of service or a reduction in the level of QoS. Alternatively, user device 205 may determine that it will agree with the request from base station 210. For example, user device 205 may determine that the handover from one frequency band to the other frequency band will not result in any loss of service or any reduction in the level of QoS.

Process 600 may include sending a result (block 630). For example, user device 205 may send a message, including the result, to base station 210. The result may be a notification that user device 205 does not want to be transferred from one frequency band to the other frequency band. Base station 210 may receive the notification and may keep user device 205 in the frequency band, base station 210 may still transfer user device 205 to the other frequency band, or base station 210 may remove user device 205 from the frequency band and disconnect user device 205 from the network. Alternatively, the result may be a notification that user device 205 will allow base station 210 to transfer user device 205 to the other frequency band. Alternatively, the result may be a notification that user device 205 may automatically connect to the other frequency band, or user device 205 may automatically connect to the particular frequency band.

Figure 7:
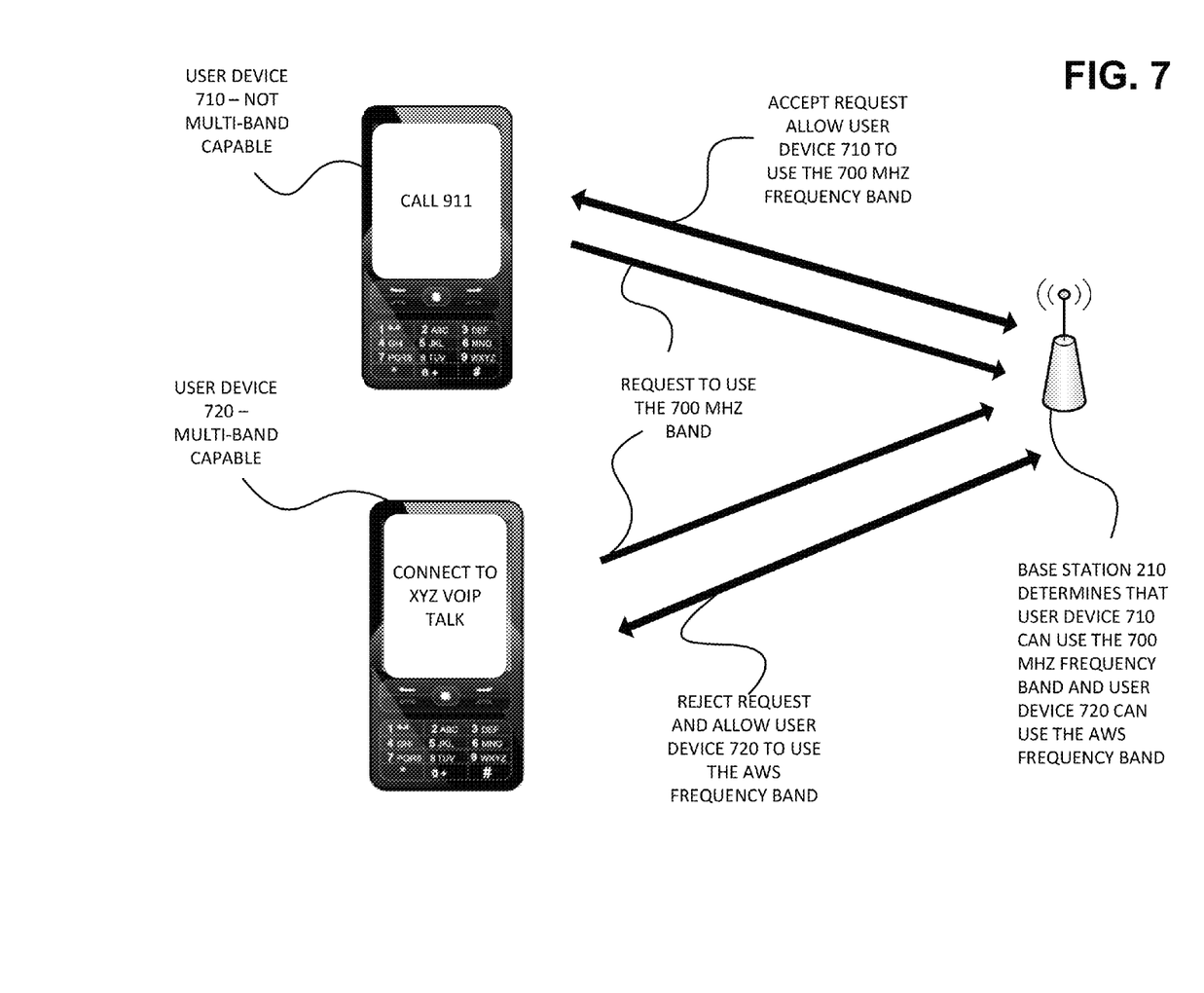
FIG. 7 is a diagram of an example process for connecting a user device to a network using a frequency band.

FIG. 7 is an example process for connecting a user device to a network using a frequency band. FIG. 7 shows base station 210, user device 710, and user device 720. User device 710 and user device 720 may each correspond to user device 205, described with regard to FIG. 2.

As shown in FIG. 7, assume that user device 710, which is not multi-band capable, is being used to make a 911 call. Assume that user device 720, which is multi-band capable, is being used to make a voice over IP (VoIP) communication. User device 720 may use an application (XYZ VoIP TALK) downloaded on user device 720 to make the communication.

Both user device 710 and user device 720 send a request to base station 210 to connect to a network (e.g., an IP network, a cellular network). Both user device 710 and user device 720 request to use the 700 MHz frequency band to connect to the network.

Base station 210 receives both requests from user device 710 and user device 720. Assume that base station 210 may determine whether there is enough capacity in the 700 MHz frequency band to allow both user device 710 and user device 720 to use this particular frequency band. Assume that base station 210 determines that there is only enough capacity in the 700 MHz frequency band to admit only one of the two user devices. Base station 210 determines that user device 710 has a higher ARP value than user device 720, because user device 710 is being used to make an emergency phone call. Further, base station 210 may determine that since user device 710 can only use the 700 MHz frequency band, user device 710 cannot use other frequency bands. Thus, base station 210 may admit user device 710 to the 700 MHz frequency band and allow the user of user device 710 to make a 911 call. Base station 210 may further determine that since user device 720 is capable of using different frequency bands to communicate with base station 210, user device 720 may use the AWS frequency band. Thus, base station 210 may admit user device 720 to the AWS frequency band and allow the user of user device 720 to send/receive VoIP communications.

As a result, a base station may allocate user devices more efficiently to different frequency bands based on the available capacity of a particular frequency band, the number of user devices requesting to use a particular frequency band, the frequency band capabilities of the user device, and/or the priority of the requested communication being made by the user device.

The foregoing description of implementations provides illustration and description, but is not intended to be exhaustive or to limit the implementations to the precise form disclosed. Modifications and variations are possible in light of the above disclosure or may be acquired from practice of the implementations.

While a series of blocks has been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a device configured to:
receive a request, from a user device, to connect to a network using a first frequency band;
determine that the first frequency band cannot accommodate the user device;
determine, based on determining that the first frequency band cannot accommodate the user device, that the user device can connect to the network using a second frequency band; and
connect, based on determining that the user device can connect to the network using the second frequency band, the user device to the network using the second frequency band rather than using the first frequency band,
when connecting the user device to the network using the second frequency band, the device is to:
transfer another user device from the second frequency band to another frequency band based on a priority, associated with the user device, being higher than a priority associated with the other user device, and
connect the user device to the network using the second frequency band after transferring the other user device from the second frequency band to the other frequency band.

2. The system of claim 1, where the device is further to:
receive a request, from a particular user device, to connect to the network using the first frequency band;
determine that the first frequency band cannot accommodate the particular user device;

determine, based on determining that the frequency band cannot accommodate the particular user device, that the particular user device has a particular priority; and connect, based on determining that the particular user device has the particular priority, the particular user device to the network using the first frequency band.

3. The system of claim 1, where the device is further to:

receive a request, from a particular user device, to connect to the network using the first frequency band;

determine that the first frequency band cannot accommodate the particular user device;

determine, based on determining that the first frequency band cannot accommodate the particular user device, that the particular user device is not capable of using the first frequency band; and deny admission for the particular user device to the network using the first frequency band.

4. The system of claim 1, where the device is further to:

receive a request, from a particular user device, to connect to the network using the first frequency band;

determine that the first frequency band cannot accommodate the particular user device;

determine, based on determining that the first frequency band cannot accommodate the particular user device, that the particular user device is multi-frequency band capable;

determine, based on determining that the particular user device is multi-frequency band capable, that the particular user device is capable of using the second frequency band;

determine, based on determining that the particular user device is capable of using the second frequency band, that the second frequency band cannot accommodate the second user device;

determine, based on determining that the second frequency band cannot accommodate the particular user device, that the particular user device is associated with a particular priority; and connect, based on determining that the particular user device is associated with the particular priority, the particular user device to the network using the second frequency band.

5. The system of claim 4, where the particular priority, associated with the particular user device, is associated with an emergency phone call.

6. The system of claim 1, where the device is further to:

receive a request, from a particular user device, to connect to the network using the first frequency band;

determine that the first frequency band cannot accommodate the particular user device;

determine, based on determining that the first frequency band cannot accommodate the particular user device, that the particular user device is multi-frequency band capable;

determine, based on determining that the particular user device is multi-frequency band capable, that the particular user device is capable of using the second frequency band;

send, based on determining that the particular user device is capable of using the second frequency band, a message to the particular user device that the second frequency band can accommodate the particular user device, the message including information regarding a capacity for the first frequency band; and receive, based on sending the message to the particular user device, a notification from the particular user device that the particular user device is connecting to the network using the second frequency band.

7. The system of claim 1, where, when determining that the first frequency band cannot accommodate the user device, the device is to:

determine that the request is associated with a level of quality of service that includes a specified packet delay budget; and determine that the first frequency band does not have enough capacity to provide the level of quality service being requested.

8. A method comprising:

receiving, by a device, a request from a user device to connect to a network using a first frequency band, the user device being capable of using the first frequency band or a second frequency band;

determining, by the device, that the first frequency band cannot accommodate the user device;

determining, by the device and based on determining that the first frequency band cannot accommodate the user device, that a priority associated with the user device is higher than a priority associated with another user device connected to the network using the second frequency; and connecting, by the device and based on determining that the priority associated with the user device is higher than the priority associated with the other user device, the user device to the network using the second frequency band rather than using the first frequency band, connecting the user device to the network using the second frequency band including:

transferring the other user device from the second frequency band to another frequency band, and connecting the user device to the network using the second frequency band after transferring the other user device from the second frequency band to the other frequency band.

9. The method of claim 8, where connecting the user device to the network using the second frequency band rather than using the first frequency band further includes:

sending a first message to the user device for the user device to connect to the network using the second frequency band instead of the first frequency band; and receiving a second message, based on sending the first message, from the user device that the user device accepts the first message for the user device to connect to the network using the second frequency band, based on the user device being capable of connecting to the network using the second frequency band.

10. The method of claim 8, further comprising:

receiving a particular request from a particular user device to connect to the network using the first frequency band, the particular user device being capable of only using the first frequency band;

determining that the particular request is associated with video content that has a particular priority level; and connecting the particular user device to the network using the first frequency band, based on the particular priority level of the particular request.

11. The method of claim 10, where connecting the particular user device to the network using the first frequency band includes:

transferring another particular user device from the first frequency band to another particular frequency band without interrupting communications between the other particular user device and the network; and connecting the particular user device to the network using the first frequency band after transferring the other particular user device from the first frequency band to the other particular frequency band.

12. The method of claim 8, further comprising:
receiving another request from the user device to connect to the network using the first frequency band,
the other request being associated with an emergency phone call;
determining that the other request has a particular priority level, based on the other request being associated with an emergency phone call; and
connecting the user device to the network using the first frequency band, based on the other request having the particular priority level, at a same time that the user device is connected to the network using the second frequency band associated with the request.

13. The method of claim 12, where connecting the user device to the network using the first frequency band includes:
transferring a particular user device from the first frequency band to a particular frequency band; and
connecting the user device to the first frequency band after transferring the particular user device from the first frequency band to the particular frequency band.

14. The method of claim 8, further comprising:
receiving a particular request, from a particular user device, to connect to the network using the first frequency band;
determining, based on receiving the particular request, that the first frequency band does not have capacity to accommodate the particular user device;
determining, based on determining that the first frequency band does not have the capacity to accommodate the particular user device, that the particular user device has a particular priority;
determining, based on determining that the particular user device has the particular priority, that the first frequency band cannot accommodate the particular user device;
determining, based on determining that the first frequency band cannot accommodate the particular user device, that the second frequency band has available capacity to accommodate the particular user device; and
connecting, based on determining that the second frequency band has available capacity to accommodate the particular user device, the particular user device to the network using the second frequency band.

15. The method of claim 14, where determining that the particular user device has the particular priority level includes:
determining that the particular request is associated with a request for receiving content that does not require a guaranteed bit rate.

16. A non-transitory computer-readable medium storing instructions, the instructions comprising:
a plurality of instructions that, when executed by one or more processors of a device, cause the one or more processors to:
receive a request from a user device to connect to a network using a first frequency band;
determine that the first frequency band cannot accommodate the user device;
determine, based on determining that the first frequency band cannot accommodate the user device, that the user device has a capability to connect to the network using a second frequency band;
determine, based on determining that the user device has the capability to connect to the network using the second frequency band, that the second frequency band does not have capacity to accommodate the user device;
determine, based on determining that the second frequency band does not have the capacity to accommodate the user device, that the request is associated with a particular priority level; and
connect, based on the request being associated with the particular priority level, the user device to the network using the second frequency band,
one or more instructions, of the plurality of instructions, to connect the user device to the network using the second frequency band including:
one or more instructions to transfer another user device from the second frequency band to another frequency band based on the particular priority level being higher than a priority level associated with a request from the other user device; and
one or more instructions to connect the user device to the network using the second frequency band after transferring the other user device from the second frequency band to the other frequency band.

17. The non-transitory computer-readable medium of claim 16, the instructions further comprising:
one or more instructions that, when executed by the one or more processors, cause the one or more processors to:
receive a particular request from a particular user device to connect to the network using the second frequency band;
determine that the particular request, from the particular user device, has a priority level higher than the particular priority level;
remove, based on determining that the particular request has a priority level than the particular priority level, the user device from the second frequency band; and
connect, based on removing the user device from the second frequency band, the particular user device to the network using the second frequency band.

18. The non-transitory computer-readable medium of claim 16, the instructions further comprising:
one or more instructions that, when executed by the one or more processors, cause the one or more processors to:
receive a particular request from a particular user device to connect to the network using the second frequency band;
determine that the particular request has a priority level lower than the particular priority level;
determine, based on determining that the particular request has a priority level lower than the particular priority level, that the particular user device can connect to the network using a third frequency band; and
connect, based on determining that the particular user device can connect to the network using the third frequency band, the particular user device to the network using the third frequency band.

19. The non-transitory computer-readable medium of claim 18, where one or more instructions, of the plurality of instructions, to determine that the particular user device can connect to the network using the third frequency band include one or more instructions to:
determine that the third frequency band has available capacity to allow the particular user device to connect to the network using the third frequency band.

20. The non-transitory computer-readable medium of claim 18, where one or more instructions, of the plurality of instructions, to determine that the particular request has a priority level lower than the particular priority level include one or more instructions to:
- determine that the particular request, from the particular user device, is associated with a non-emergency phone call; and
- determine that the request, from the user device, is associated with an emergency phone call.

\* \* \* \* \*